(12) United States Patent
Christensen et al.

(10) Patent No.: US 12,546,271 B2
(45) Date of Patent: Feb. 10, 2026

(54) ENERGY HARVESTING SYSTEM AND METHOD WITH STIRLING ENGINE FOR CONTAINER MANUFACTURING PROCESS

(71) Applicant: Stolle Machinery Company, LLC, Centennial, CO (US)

(72) Inventors: Stephen D. Christensen, Highlands Ranch, CO (US); John Nigel Grainger, West Yorkshire (GB)

(73) Assignee: Stolle Machinery Company, LLC, Centennial, CO (US)

( * ) Notice: Subject to any disclaimer, the term of this patent is extended or adjusted under 35 U.S.C. 154(b) by 2 days.

(21) Appl. No.: 18/951,864

(22) Filed: Nov. 19, 2024

(65) Prior Publication Data

US 2025/0172108 A1    May 29, 2025

Related U.S. Application Data

(60) Provisional application No. 63/603,203, filed on Nov. 28, 2023.

(51) Int. Cl.
*F02G 5/02* (2006.01)
*F02G 1/055* (2006.01)

(52) U.S. Cl.
CPC ............... *F02G 5/02* (2013.01); *F02G 1/055* (2013.01)

(58) Field of Classification Search
CPC .......... F02G 5/02; F02G 1/055; F26B 21/086; F26B 21/002; F26B 3/04; F26B 15/18; F01D 15/10; G01M 15/14; G01L 3/16; B21D 51/00; B21D 51/26

USPC ......................................................... 60/517
See application file for complete search history.

(56) References Cited

U.S. PATENT DOCUMENTS

| | | | |
|---|---|---|---|
| 5,129,252 A * | 7/1992 | Hahn | B21D 51/26 72/349 |
| 2011/0000407 A1 * | 1/2011 | Bassett | F01K 7/38 110/238 |
| 2012/0031079 A1 | 2/2012 | Spicer et al. | |
| 2012/0193837 A1 * | 8/2012 | Wasmuht | H02J 11/00 425/526 |
| 2016/0273435 A1 | 9/2016 | Hussain et al. | |
| 2016/0290280 A1 * | 10/2016 | Blankenship | G01M 15/14 |
| 2017/0012225 A1 | 1/2017 | Heo et al. | |
| 2023/0051688 A1 * | 2/2023 | Faulkner | F26B 23/02 |

FOREIGN PATENT DOCUMENTS

WO    2014127784 A1    8/2014

OTHER PUBLICATIONS

U.S. Patent and Trademark Office ISA/US, PCT Appl. No. PCT/US2024/056576, International Search Report, 17 pages Feb. 7, 2025.

* cited by examiner

*Primary Examiner* — Mark A Laurenzi
*Assistant Examiner* — Kelsey L Stanek
(74) *Attorney, Agent, or Firm* — Eckert Seamans Cherin & Mellott, LLC

(57) ABSTRACT

An energy harvesting system for use in a container manufacturing process includes a heat exchanger structured to receive waste energy from a waste energy source in the container manufacturing process and to heat a working fluid using the waste energy, and a Stirling engine structured to convert heat in the working fluid to mechanical work.

16 Claims, 4 Drawing Sheets

ENERGY HARVESTING SYSTEM AND METHOD WITH STIRLING ENGINE FOR CONTAINER MANUFACTURING PROCESS

CROSS REFERENCE TO RELATED APPLICATION

This application claims priority to U.S. Provisional Patent Application Ser. No. 63/603,203, filed Nov. 28, 2023, entitled, Energy Harvesting System And Method With Stirling Engine For Container Manufacturing Process.

FIELD OF THE INVENTION

The disclosed concept relates generally to metal container manufacturing systems and methods and, more particularly, for improved energy efficiency in metal container manufacturing systems and methods.

BACKGROUND OF THE INVENTION

The manufacturing process of metal beverage and food containers (e.g., cans) can be energy intensive. A part of the process includes passing the cans through an oven to cure internal coatings and external ink and varnish. A schematic diagram of a typical oven system 10 is shown in FIG. 1.

The oven system 10 includes a direct fired gas burner 14 that is fed natural gas 16 and combustion air 18. The burner 14 burns natural gas 16 in a combustion chamber 12, which heats air flowing around the combustion chamber 12 to a desired temperature. Cool fresh air 20 may also be drawn into the combustion chamber 12 to balance pressures and adjust temperatures in the system.

The heated air is transported to an oven cavity 24 via a feed duct 22. A recirculation fan may be disposed along the feed duct to assist with transport of the heated air to the oven cavity 24. Cans are transported through the oven cavity 24 by a continuous conveyor 26. While passing through oven cavity, the can are subjected to the heated air, which cures internal coating and external ink and varnish on the cans. A portion of the heated air is exhausted, usually to atmosphere, via an exhaust duct 28. Another portion of the heated air is transported back to the combustion chamber 12 via a recirculation duct 30.

The process of generating the heated air is energy intensive. Additionally, the heated air that is exhausted results is waste of energy. Overall, the typical curing process can be energy intensive and wasteful. In addition to the curing process, other parts of the manufacturing process can result in waste energy that is often exhausted.

There is room for improvement in metal container manufacturing systems and methods.

SUMMARY OF THE INVENTION

According to an aspect of the disclosed concept, an energy harvesting system for use in a container manufacturing process comprises: a heat exchanger structured to receive waste energy from a waste energy source in the container manufacturing process and to heat a working fluid using the waste energy; and a Stirling engine structured to convert heat in the working fluid to mechanical work.

According to an aspect of the disclosed concept, an energy harvesting system for use in a container manufacturing process comprises: a waste energy source in the container manufacturing process structured to generate waste energy and to heat a coolant with the waste energy; a heat exchanger structured to receive the heated coolant and to heat a working fluid using the heated coolant; a Stirling engine structured to convert heat in the working fluid to mechanical work; a shaft coupled to the Stirling engine, wherein the mechanical work is turning of the shaft; a generator coupled to the shaft and structured to convert turning of the shaft to electric power; and a powered component of the container manufacturing process, wherein the powered component is coupled to the generator is structured to receive and use electric power from the generator.

According to an aspect of the disclosed concept, a method of harvesting energy using a Stirling engine in a container manufacturing process comprises: heating working fluid with waste energy from the container manufacturing process; converting heat from the working fluid to mechanical work using the Stirling engine; converting the mechanical work to electrical power; and using the electrical power in a powered component in the container manufacturing process.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
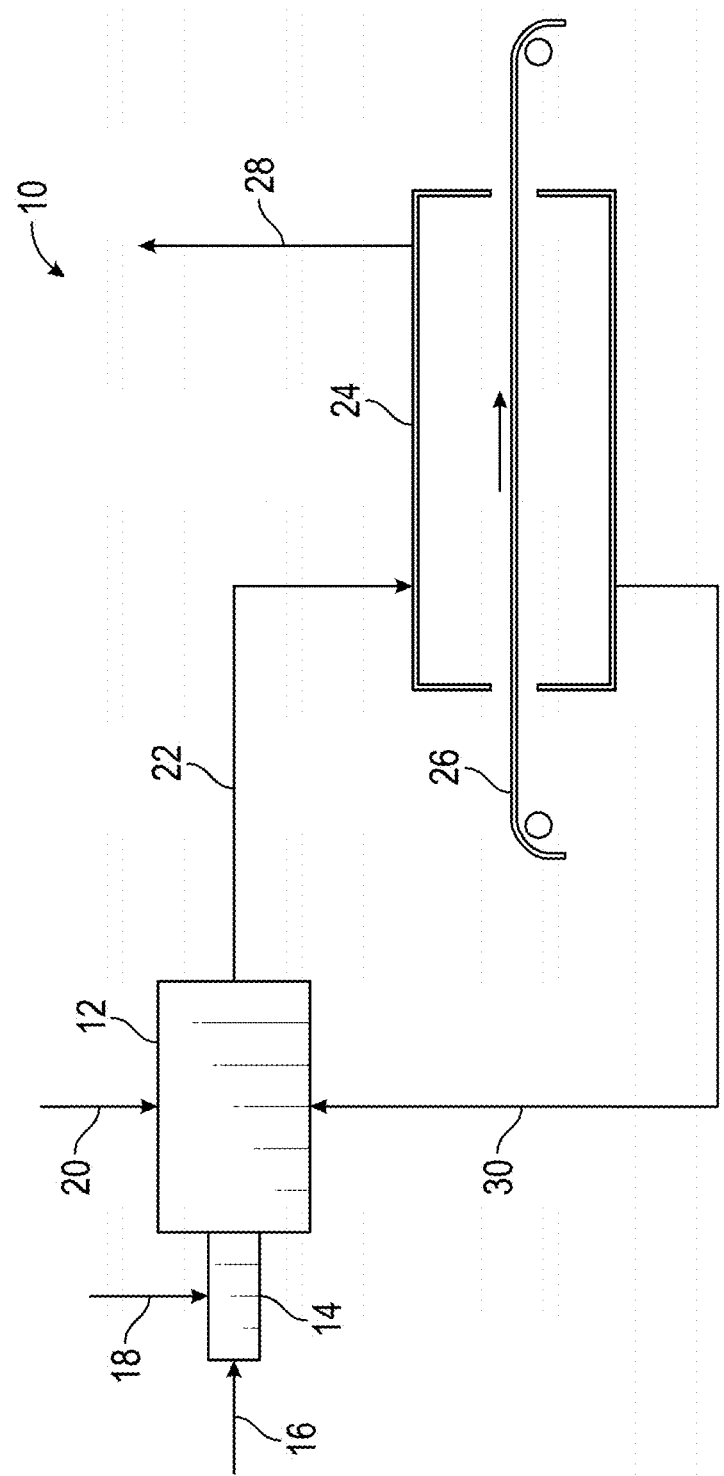
FIG. 1 is a schematic diagram of a can oven system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

Figure 2:
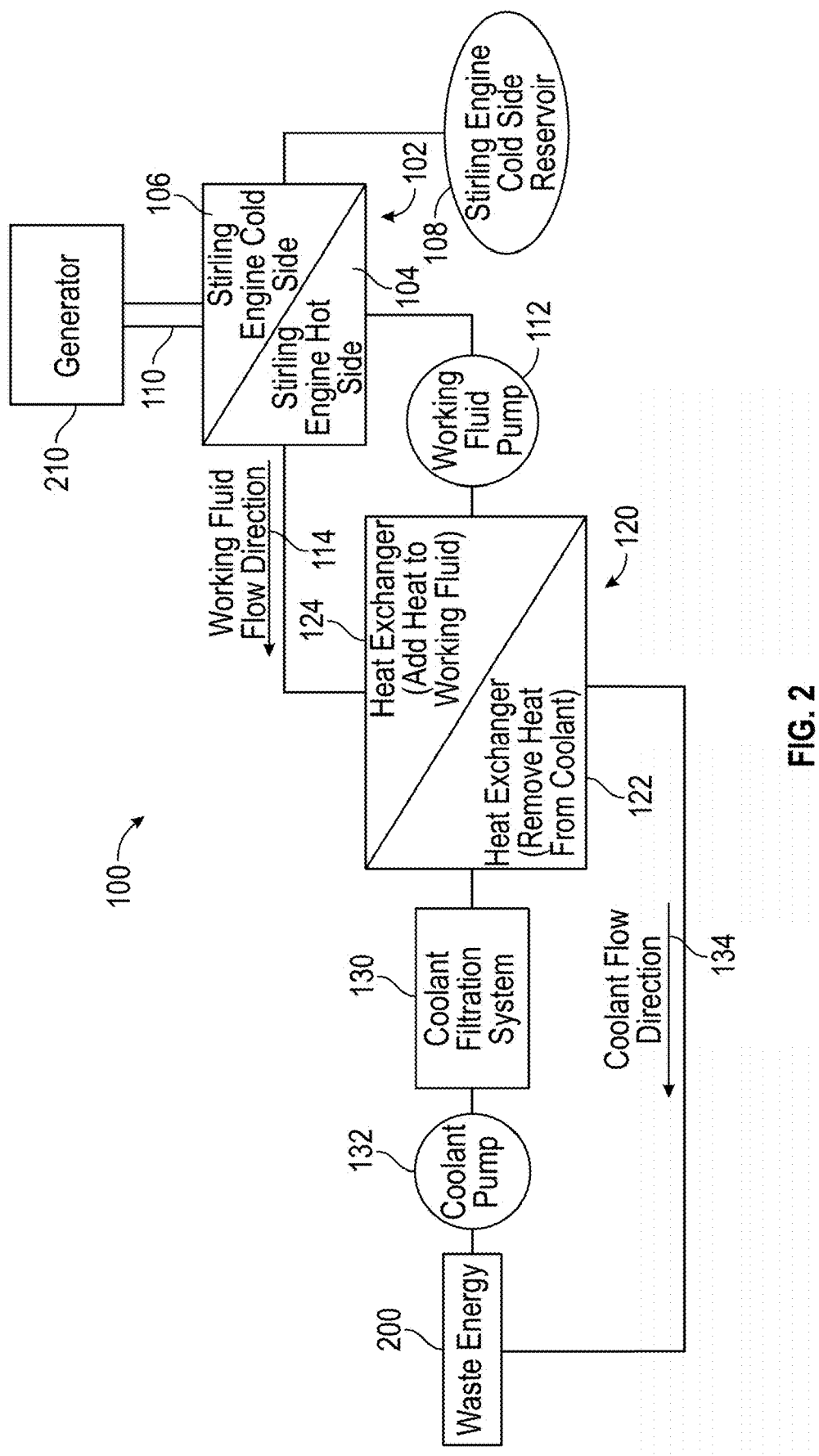
FIG. 2 is a schematic diagram of an energy harvesting system using a Stirling engine for a container manufacturing process in accordance with an example embodiment of the disclosed concept.

FIG. 2 is a schematic diagram of an energy harvesting system 100 for harvesting waste energy in a metal container manufacturing process. The energy harvesting system 100 is structured to harvest waste energy from a waste energy source 200. The waste energy source 200 may be any waste energy source in the metal container manufacturing process. For example and without limitation, the waste energy source 200 may be exhaust heat from a can oven, such as that shown in FIG. 1, or a can dryer. However, it will be appreciated that the waste energy source 200 may come from other components or combinations of components in the metal container manufacturing process. For example and without limitation, a bodymaker in the metal container manufacturing process may be the waste energy source 200.

In some example embodiments, the waste energy is in the form of heat, such as for example and without limitation, the exhaust (i.e., heated air) from a can oven that would previously have been exhausted to atmosphere. In some example embodiments, the heat may be a coolant liquid or gas that has been heated as a result of cooling part of the metal container manufacturing process. For example, a coolant may be used in the bodymaker or other machines in the metal container manufacturing process. The heated coolant then contains waste energy in the form of heat.

The energy harvesting system 100 includes a Stirling engine 102. The Stirling engine 100 includes a hot side 104 and a cold side 106. A cold side reservoir 108 is associated with the cold side 106. A working fluid is sealed inside the Stirling engine 102. The working fluid may be any suitable type of gas such as, for example and without limitation, air, helium, hydrogen, nitrogen, or any other suitable gas. The Stirling engine 102 is operable to convert heat in the working fluid into mechanical action. Namely, the Stirling engine 102 is coupled to a shaft 110 and is operable to convert heat in the working fluid into rotation of the shaft 110. The Stirling engine 102 further includes a heat exchanger 120 that is structured to exchange heat from a coolant to the working fluid to heat the working fluid. The Stirling engine 102 may also include a working fluid pump 112 structured to pump the working fluid to the hot side 104 and back to the heat exchanger 120 in a working fluid flow direction 114.

The Stirling engine 102 may be any suitable type of Stirling engine. A Stirling engine is closed-cycle and operates on a fixed mass of working fluid. That is, a fixed mass of working fluid is sealed in the Stirling engine 102. The Stirling engine 102 uses a temperature difference between the hot side 104 and the cold side 106 to establish a cycle of heated and expanded working fluid on the hot side 104 to cooled and compressed working fluid on the cold side 106. For example, heated working fluid on the hot side 104 expands to push a power piston or diaphragm in a power stroke. In the power stroke, the heating working fluid moves to the cold side 106 where it is cooled and compressed. On a return stroke, the power piston or diaphragm pushes working fluid from the cold side 106 back to the hot side 104. Since the return stroke is acting on cooled and compressed working fluid, it requires less work than the power stroke, thus resulting in a net positive power output. The power output of the power stroke may be used to convert the heat of the working fluid into mechanical power such as turning the shaft 110. For example, the power piston or diaphragm may be coupled to the shaft such that the power stroke and return stroke rotate the shaft.

As noted above, the Stirling engine 102 may be any suitable type of Stirling engine. The Stirling engine 102 may have several components such as, without limitation, a regenerator between the hot side 104 and the cold side 106 to take heat from the working fluid as it moves from the hot side 104 to the cold side 106 and return heat to the working fluid as it moves from the cold side 106 to the hot side 104. The Stirling engine 102 may also have one or more heat sinks to assist with cooling working fluid on the cold side 106. In some example embodiments, the Stirling engine 102 may include a displacer to assist with moving working fluid between the hot and cold sides 104,106 of the Stirling engine 102, depending on which type of Stirling engine is employed.

The heat exchanger 120 operates as the external heat source for the Stirling engine 102. The heat exchanger 120 may have a cooling path 122 and a heating path 124. The coolant passes through the cooling path 122 and the working fluid passes through the heating path 124. The cooling path 122 and the heating path 124 are isolated such that the coolant and the working fluid do not mix. However, the cooling path 122 and the heating path 124 are in contact with each other so that heat from the coolant is passed to the working fluid. The heat exchanger 120 may take any suitable form such as, for example and without limitation, a double-pipe heat exchanger, a shell-and-tube heat exchanger, a plate heat exchanger, or any other suitable type of heat exchanger.

The cooling path 122 of the heat exchanger 120 may be coupled to a coolant loop. In the coolant loop, the coolant flows by the waste energy source 200 where it is heated by the waste energy source 120 to the cooling path 122, where heat from the heated coolant is transferred to the working fluid in the heating path 124 of the heat exchanger 120. The coolant loop may also include a coolant pump 132 to facilitate flow of the coolant in the coolant flow direction 134. The coolant loop may also include a coolant filtration system 130 structured to treat and/or filter the coolant in the coolant loop. In some example embodiments, the waste energy source 200 may include a second heat exchanger structured to transfer heat from the waste energy source 200 to the coolant.

As described in this embodiment, heat from the waste energy source 200 is transferred to the hot side 104 of the Stirling engine 102 and the Stirling engine 102 converts the heat to mechanical work in the form of turning a shaft 110. The turning of the shaft may then be used in the container manufacturing process. For example and without limitation, the turning of the shaft 110 may turn a generator 210 structured to generate electrical power that may be used in various parts of the container manufacturing process. For example, the power may be used to run low friction electromagnetic or pneumatic bearings in the container manufacturing process. By using the waste energy source 200 from the container manufacturing process to power the Stirling engine 102, and then using the mechanical work output of the Stirling engine 102 in the container manufacturing process, the container manufacturing process becomes more energy efficient by reusing waste energy instead of exhausting or otherwise disposing of it.

Figure 3:
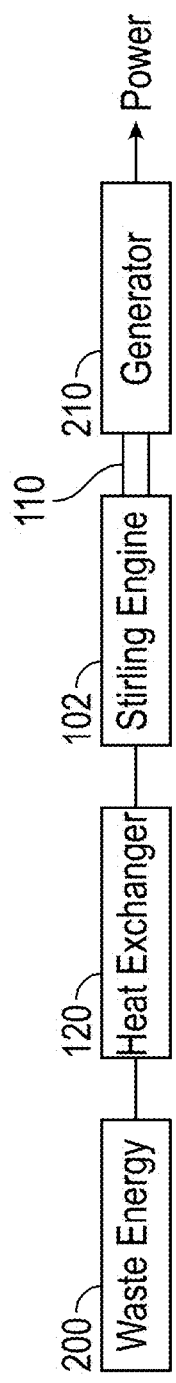
FIG. 3 is a simplified schematic diagram of an energy harvesting system using a Stirling engine for a container manufacturing process in accordance with an example embodiment of the disclosed concept.

FIG. 3 is a simplified schematic diagram of an energy harvesting system for use in the container manufacturing process in accordance with an example embodiment of the disclosed concept. The embodiment shown in FIG. 3 includes a waste energy source 200, a heat exchanger 120, a Stirling engine 102, a shaft 110, and a generator 210. These components have been described with respect to FIG. 2. For economy of disclosure, a repeated description of these components is omitted. In some example embodiments, the waste energy 200 from the container manufacturing process is directly provided to the heat exchanger 120. For example, the waste energy 200 may be heated air exhausted from a can oven or dryer that is directly provided to the heat exchanger 120 where it is used to heat the working fluid that subsequently turns the Stirling engine 102. As another example, the waste energy 200 may be a heated liquid, such as a heated lubricant used in the container manufacturing process that is provided directly to the heat exchanger 120 to heat the working fluid. While the example embodiment shown in FIG. 3 is simplified, it will be understood that additional components such as, for example and without limitation, a working fluid pump 112 and a Stirling engine cold reservoir 108 may be added without departing from the scope of the disclosed concept.

Figure 4:
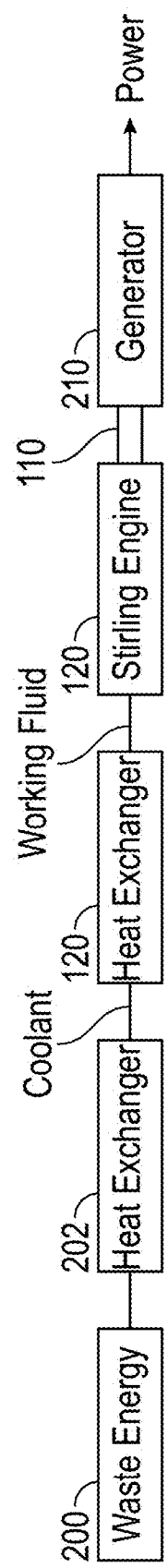
FIG. 4 is a simplified schematic diagram of an energy harvesting system using a Stirling engine for a container manufacturing process in accordance with an example embodiment of the disclosed concept.

FIG. 4 is a simplified schematic diagram of an energy harvesting system for use in the container manufacturing process in accordance with an example embodiment of the disclosed concept. The embodiment shown in FIG. 4 includes a waste energy source 200, a heat exchanger 120, a Stirling engine 102, a shaft 110, and a generator 210. These components have been described with respect to FIG. 2. For economy of disclosure, a repeated description of these components is omitted. This embodiment further includes a second heat exchanger 202. The second heat exchanger 202 is structured to directly receive the waste energy 200 and to heat a coolant with the waste energy 200. The heated coolant is then provided to the heat exchanger 120 to heat the working fluid that subsequently turns the Stirling engine 102. In some applications the use of the second heat exchanger 202 and coolant may be more suitable than providing the waste energy 200 directly to the heat exchanger 120. For example, in applications where the waste energy 200 is not located proximate the heat exchanger 120, it can be more efficient to heat the coolant with the waste energy 200 and route the coolant to the heat exchanger 120. While the example embodiment shown in FIG. 4 is simplified, it will be understood that additional components such as, for example and without limitation, a coolant pump 132, a coolant filtration system 130, a working fluid pump 112 and a Stirling engine cold reservoir 108 may be added without departing from the scope of the disclosed concept.

It will also be appreciated that the heat exchanger 120 may receive heat from multiple sources including, for example and without limitation, multiple waste energy sources 200 and/or multiple heat exchangers 202 associated with one or more waste energy sources 200. It will also be appreciated that multiple heat exchangers 120 may be associated with the Stirling engine 102. For example, multiple heat exchangers 120 may heat the working fluid associated with the Stirling engine 102. Furthermore, it will be appreciated that a container manufacturing process may include multiple energy harvesting systems. For example, multiple waste energy sources 200 in the container manufacturing process may be associated with an energy harvesting system or with multiple energy harvesting systems. For example, one or more waste energy sources 200 may power one Stirling engine 102 while one or more other waste energy sources 200 may power another Stirling engine 102. As a non-limiting example, multiple heated air waste energy sources 200 may all be collected to power one Stirling engine 102 while multiple heated liquid waste energy sources 200 may all be collected to power another Stirling engine 102.

Figure 5:
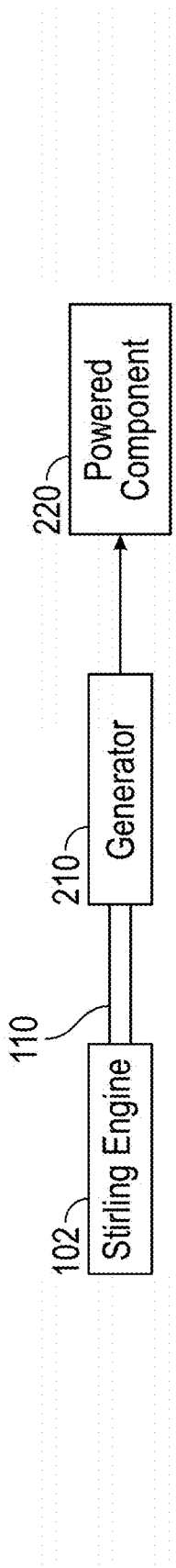
FIG. 5 is simplified schematic diagram of an output of an energy harvesting system using a Stirling engine for a container manufacturing process in accordance with an example embodiment of the disclosed concept.

FIG. 5 is a simplified schematic diagram of the output of an energy harvesting system for a container manufacturing process in accordance with an example embodiment of the disclosed concept. As previously described, the Stirling engine 102 converts waste energy into mechanical work. In some example embodiments, the mechanical work is in the form of turning a shaft 110 coupled to the Stirling engine 102. In some example embodiments, the shaft 110 is coupled to a generator 210 structured to convert the turning of the shaft 110 into electrical power. The electrical power is then used to power a powered component 220 in the container manufacturing process. The powered component 220 may be any suitable powered component used in the container manufacturing process. In some example embodiments, the powered component 220 may be low friction electromagnetic or pneumatic bearings, air compressors, or a backup power storage system. However, it will be appreciated that any powered component in the container manufacturing process may utilize the harvested energy. By reusing the harvested energy in the container manufacturing process, the waste energy 200 that would otherwise have been wasted through exhaust or other disposal is now reused making the container manufacturing process more energy efficient.

Figure 6:
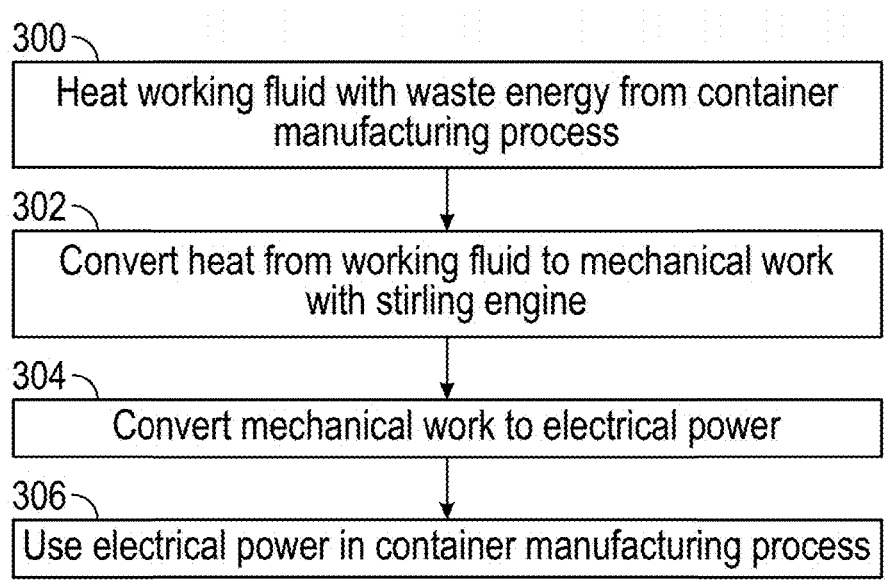
FIG. 6 is a flowchart of a method of harvesting energy in a container manufacturing process using a Stirling engine in accordance with an example embodiment of the disclosed concept.

FIG. 6 is flowchart of a method of harvesting energy using a Stirling engine in the container manufacturing process in accordance with an example embodiment of the disclosed concept. The process begins at 300 by heating working fluid with waste energy from the container manufacturing process. As described above, the waste energy may come from any component in the container manufacturing process that produces waste energy. For example, exhaust from a can oven or dryer may be the waste energy, or heat from other components such as a bodymaker or other machinery may be the waste energy. A heat exchanger may be used to heat the working fluid with the heat from the waste energy. At 302, the heat from the working fluid is converted to mechanical work using a Stirling engine. In some example embodiments, the mechanical work comes in the form of turning a shaft. At 304, the mechanical work is converted into electrical power, for example, through the use of a generator coupled to the shaft. At 306, the electrical power is then used in the container manufacturing process. As described above, the electrical power may be used to power, for example and without limitation, low friction electromagnetic or pneumatic bearings, air compressors, or a backup power storage system. By harvesting the waste energy through the use of a Stirling engine, and then using the harvested energy in the container manufacturing process, the container manufacturing process becomes more energy efficient.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An energy harvesting system for use in a metal container manufacturing process, the energy harvesting system comprising:
　　a heat exchanger structured to receive waste energy from a waste energy source in the metal container manufacturing process and to heat a working fluid using the waste energy; and a Stirling engine structured to convert heat in the working fluid to mechanical work to generate electric power; and a powered component of the metal container manufacturing process, wherein the powered component is structured to receive and use the electric power, wherein the working fluid is a gas, and wherein the waste energy is generated by one or more of a can oven, a can dryer, and a bodymaker.

2. The energy harvesting system of claim 1, further comprising:
a shaft coupled to the Stirling engine, wherein the mechanical work is turning of the shaft.

3. The energy harvesting system of claim 2, further comprising:
a generator coupled to the shaft and structured to convert turning of the shaft to electric power.

4. The energy harvesting system of claim 1, wherein the powered component is a low friction pneumatic or electromagnetic bearing.

5. The energy harvesting system of claim 1, wherein the waste energy is exhaust from the can oven or the can dryer.

6. The energy harvesting system of claim 1, further comprising:
a second heat exchanger structured to directly receive the waste energy from the waste energy source and to use the waste energy to heat a coolant, and
wherein the heat exchanger is a first heat exchanger structured to receive the coolant and to heat the working fluid using heat from the coolant.

7. The energy harvesting system of claim 1, wherein the heat exchanger is one of a double-pipe heat exchanger, a shell-and-tube heat exchanger, and a plate heat exchanger.

8. The energy harvesting system of claim 1, wherein the heat exchanger is structured to directly receive the waste energy from the waste energy source.

9. The energy harvesting system of claim 1, further comprising:
a working fluid pump structured to pump the working fluid to the Stirling engine.

10. The energy harvesting system of claim 1, further comprising:
a coolant pump structured to pump the waste energy to the heat exchanger.

11. An energy harvesting system for use in a metal container manufacturing process, the energy harvesting system comprising:

a waste energy source in the metal container manufacturing process structured to generate waste energy and to heat a coolant with the waste energy;

a heat exchanger structured to receive the heated coolant and to heat a working fluid using the heated coolant;

a Stirling engine structured to convert heat in the working fluid to mechanical work;

a shaft coupled to the Stirling engine, wherein the mechanical work is turning of the shaft;

a generator coupled to the shaft and structured to convert turning of the shaft to electric power; and a powered component of the metal container manufacturing process, wherein the powered component is coupled to the generator is structured to receive and use electric power from the generator, wherein the working fluid is a gas, and wherein the waste energy is generated by one or more of a can oven, a can dryer, and a bodymaker.

12. The energy harvesting system of claim 11, further comprising:
a coolant pump structured to pump the coolant to the heat exchanger;
a coolant filtration system structured to treat or filter the coolant; and
a working fluid pump structured to pump the working fluid to the Stirling engine.

13. The energy harvesting system of claim 11, wherein the waste energy is exhaust from the can oven or the can dryer.

14. A method of harvesting energy using a Stirling engine in a metal container manufacturing process, the method comprising:
heating working fluid with waste energy from the metal container manufacturing process;
converting heat from the working fluid to mechanical work using the Stirling engine;
converting the mechanical work to electrical power; and
using the electrical power in a powered component in the metal container manufacturing process,
wherein the working fluid is a gas, and
wherein the waste energy is generated by one or more of a can oven, a can dryer, and a bodymaker.

15. The method of claim 14, wherein heating working fluid with the waste energy includes using a heat exchanger to heat the working fluid with the waste energy.

16. The method of claim 14, wherein the waste energy is exhaust from the can oven or the can dryer.

* * * * *